(12) United States Patent
Dölle et al.

(10) Patent No.: US 12,322,968 B2
(45) Date of Patent: Jun. 3, 2025

(54) CERTIFICATION OF AT LEAST ONE INSTALLATION-SPECIFIC AMOUNT OF ENERGY OF AN ENERGY SYSTEM

(71) Applicant: Siemens Aktiengesellschaft, Munich (DE)

(72) Inventors: Oliver Dölle, Erlangen (DE); Sebastian Schreck, Nuremberg (DE); Sebastian Thiem, Neustadt an der Aisch (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 530 days.

(21) Appl. No.: 17/793,331

(22) PCT Filed: Jan. 14, 2021

(86) PCT No.: PCT/EP2021/050606
§ 371 (c)(1),
(2) Date: Jul. 15, 2022

(87) PCT Pub. No.: WO2021/148288
PCT Pub. Date: Jul. 29, 2021

(65) Prior Publication Data
US 2023/0040893 A1 Feb. 9, 2023

(30) Foreign Application Priority Data
Jan. 23, 2020 (DE) ...................... 10 2020 200 811.6

(51) Int. Cl.
*H02J 3/00* (2006.01)
*G05B 15/02* (2006.01)
(52) U.S. Cl.
CPC .............. *H02J 3/008* (2013.01); *G05B 15/02* (2013.01); *H02J 2310/70* (2020.01)

(58) Field of Classification Search
CPC ........ H02J 3/008; H02J 2310/70; G05B 15/02
(Continued)

(56) References Cited

U.S. PATENT DOCUMENTS

| 2014/0207298 A1* | 7/2014 | Gupta | G05B 15/02 700/291 |
| 2016/0306373 A1* | 10/2016 | Mashima | G06Q 50/06 |

(Continued)

FOREIGN PATENT DOCUMENTS

EP 3518369 A1 7/2019

OTHER PUBLICATIONS

Sasson, Fabrizio et al., "Unsupervised Disaggregation of Photovoltaic Production from Composite Power Flow Measurements of Heterogeneous Prosumers," IEEE Transactions on Industrial Informatics, vol. 14, No. 9, 9 pages, Jan. 15, 2019.
(Continued)

*Primary Examiner* — Yemane Mehari
(74) *Attorney, Agent, or Firm* — Slayden Grubert Beard PLLC

(57) ABSTRACT

Various embodiments include a method for certifying at least one installation-specific amount of energy, wherein the installation-specific amount of energy has been generated or consumed by an energy installation of an energy system. The method may include: capturing a temporal measured signal accumulated in relation to the energy system of a measured variable associated with the amount of energy; transmitting the captured signal to a test unit external to the energy system; disaggregating the transmitted signal using the test unit, and ascertaining the installation-specific amount of energy by way of the disaggregation; issuing a certificate regarding the ascertained installation-specific amount of energy; and receiving the issued certificate at the energy system.

13 Claims, 2 Drawing Sheets

(58) Field of Classification Search
USPC .............................................................. 363/1
See application file for complete search history.

(56) References Cited

U.S. PATENT DOCUMENTS

| | | | |
|---|---|---|---|
| 2019/0261067 A1* | 8/2019 | Norwood | H04Q 9/00 |
| 2021/0036521 A1* | 2/2021 | Chapotard | H02J 13/00001 |
| 2024/0354774 A1* | 10/2024 | Marangu | H02J 3/381 |

OTHER PUBLICATIONS

German Office Action, Application No. 102020200811.6, 4 pages, Feb. 24, 2021.
Search Report for International Application No. PCT/EP2021/050606 13 pages, Apr. 21, 2021.

* cited by examiner

CERTIFICATION OF AT LEAST ONE INSTALLATION-SPECIFIC AMOUNT OF ENERGY OF AN ENERGY SYSTEM

CROSS-REFERENCE TO RELATED APPLICATIONS

This application is a U.S. National Stage Application of International Application No. PCT/EP2021/050606 filed Jan. 14, 2021, which designates the United States of America, and claims priority to DE Application No. 10 2020 200 811.6 filed Jan. 23, 2020, the contents of which are hereby incorporated by reference in their entirety.

TECHNICAL FIELD

The present disclosure relates energy systems. Various embodiments include methods and/or energy systems.

BACKGROUND

Energy systems are typically connected via a grid connection point (point of common coupling; PCC for short) to an energy grid, for example a power grid, for energy exchange. Below the grid connection point, the energy system typically comprises a plurality of energy installations, in particular energy generation installations (generators), energy consumption installations (consumers) and/or energy storage installations (energy stores). By way of example, electrical power is generated or consumed by the energy installations.

At the grid connection point, an energy system typically has a measurement point that is used by the respective energy supplier to determine the amount of energy drawn (output) from the power grid and/or fed into the power grid. In other words, a summed, that is to say accumulated, measured signal of all the feeding-in and outputting energy installations is captured at the measurement point mentioned.

In particular with regard to local energy markets, it is advantageous to ascertain and to verify the origin of a generated amount of energy. In known energy systems, this is not possible on account of the individual measurement of the accumulated measured signal. By way of example, as a result, an amount of energy generated by means of a photovoltaic installation cannot be determined. With regard to energy generated from renewable sources, identifying and verifying the amount of energy generated is therefore particularly advantageous.

One possible solution to the problem mentioned is trading with what are known as renewable energy certificates. However, it is not possible to provide proof of the exact origin of the energy in this case either. Therefore, in order to solve the problem, a separate measuring device would have to be provided or installed for each energy installation of the energy system. However, this involves a great deal of effort and costs and is therefore not feasible.

A further disadvantage of the renewable energy certification system is that it is not suitable for local energy markets. This is therefore the case, since invoicing and allocation within a local energy market requires a considerably smaller time range, for example 15 minute averages. A local energy market is described in EP 3518369 A1.

SUMMARY

The present disclosure describes methods and systems for providing certifying an amount of energy that avoids the above-mentioned disadvantages. For example, some embodiments include a method for certifying at least one installation-specific amount of energy, wherein the installation-specific amount of energy has been generated or consumed by at least one energy installation (21, 22, 23) of an energy system (2), characterized by: capturing (20) at least one temporal measured signal (240), accumulated in relation to the energy system (2), of at least one measured variable associated with the amount of energy; transmitting (100) the captured measured signal (240) to a test unit (4) external to the energy system (2); the test unit (4) disaggregating (40) the transmitted measured signal (240), wherein the installation-specific amount of energy is ascertained by way of the disaggregation (40); issuing a certificate (42) regarding the ascertained installation-specific amount of energy; and the energy system (2) receiving the issued certificate (42).

In some embodiments, the energy system (2) is connected via a grid connection point (3) to an energy grid (1) for energy exchange, and the accumulated measured signal (240) is captured at the grid connection point (3) of the energy system (2).

In some embodiments, a voltage, a current, a phase angle, an active power and/or a reactive power is used as the measured variable.

In some embodiments, the captured measured signal (240) is transmitted (100) and/or the certificate (42) is received by a calibrated measuring device (24) with a communication interface, in particular by a smart meter.

In some embodiments, the structure of the energy system (2) with regard to its energy installations (21, 22, 23) is additionally transmitted to the test unit (4), and the transmitted structure is taken into account in the disaggregation (40).

In some embodiments, geographical coordinates of the energy system (2), weather data and/or historical measured signals are additionally transmitted as data to the test unit (4), and in that there is a plausibility check of the ascertained installation-specific amount of energy based on the additionally transmitted data.

In some embodiments, the measured signal (240) extends over a time range of at most 20 minutes, in particular of at most 15 minutes.

In some embodiments, at least one power curve (41) of the energy installation is ascertained by way of the disaggregation (40), and the power curve (41) is received by the energy system (2).

In some embodiments, the energy system (2) is integrated into a local energy market, and in that the certificate (42) received by the energy system (2) is transmitted to the local energy market.

In some embodiments, historical measured signals and/or metadata of the energy system (2) are transmitted to the test unit (4) by the local energy market.

As another example, some embodiments include an energy system (2), comprising at least one energy installation (21, 22, 23), in particular an energy generation installation (21, 22), wherein an installation-specific amount of energy can be generated or consumed by the at least one energy installation (21, 22, 23) over a time range, characterized in that the energy system (2) comprises a measuring device (24) with a communication interface, wherein the measuring device (24) is designed to capture a temporal measured signal (240), accumulated in relation to the energy system (2), of at least one measured variable associated with the amount of energy; and the captured measured signal (240) can be transmitted to a test unit (4) external to the energy system (2) by means of the communication interface of the measuring device (24); and a certificate (42) issued by the test unit (4) regarding the installation-specific amount of energy can be received by the energy system (2), wherein the installation-specific amount of energy has been ascertained by the test unit (4) by means of a disaggregation (40).

In some embodiments, it is integrated into a local energy market for exchanging energy.

BRIEF DESCRIPTION OF THE DRAWINGS

Further advantages, features, and details of the teachings herein will emerge from the exemplary embodiments described below and with reference to the drawings, in which, schematically.

Identical, equivalent, or functionally identical elements may be provided with the same reference signs in one of the figures or throughout the figures.

DETAILED DESCRIPTION

Figure 1:
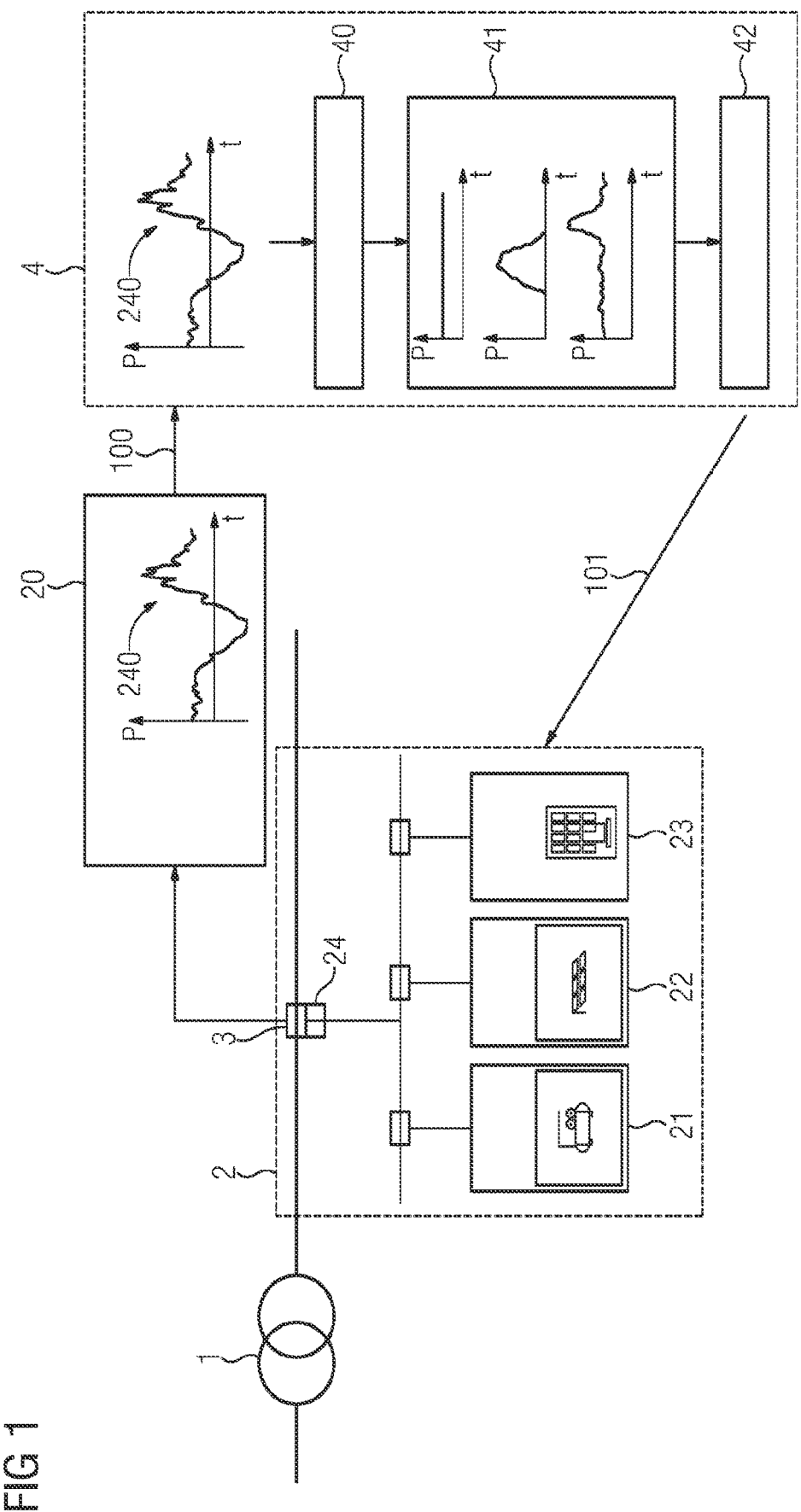
FIG. 1 shows a diagram of a method incorporating teachings of the present disclosure.

Various embodiments of the teachings herein include a method for certifying at least one installation-specific amount of energy, wherein the installation-specific amount of energy has been generated or consumed by at least one energy installation of an energy system, characterized at least by the following steps of:

capturing at least one temporal measured signal, accumulated in relation to the energy system, of at least one measured variable associated with the amount of energy;

transmitting the captured measured signal to a test unit external to the energy system;

the test unit disaggregating the transmitted measured signal, wherein the installation-specific amount of energy is ascertained by way of the disaggregation;

issuing a certificate regarding the ascertained installation-specific amount of energy; and the energy system receiving the issued certificate.

Energy systems typically comprise a plurality of components, in particular energy installations, for example energy generation installations or energy conversion installations, energy consumption installations and/or energy storage installations. The energy system can be designed as a multimodal energy system. In particular, multimodal energy systems are characterized in that they generate and/or provide multiple forms of energy. By way of example, a multimodal energy system provides one or more forms of energy for an energy consumer, for example a building, an industrial installation or private installations, wherein the provision is effected in particular by means of a conversion of various forms of energy, by means of a transportation of various forms of energy and/or by means of stored forms of energy. In other words, the various forms of energy, for example heat, cold or electrical energy, are coupled by means of the multimodal energy system in terms of their generation, their provision and/or their storage. The energy system can be a building, an industrial installation, a household, a campus and/or a further distinguishable energy unit/installation. Furthermore, the energy system can comprise a plurality of energy subsystems.

The energy installations/components that the energy system can comprise are one or more power generators, combined heat and power installations (CHP installations), in particular cogeneration plants, gas boilers, diesel generators, heat pumps, compression refrigeration machines, absorption refrigeration machines, pumps, district heating networks, energy transfer lines, in particular for electricity and/or heat and/or chemical substances, for example gas and/or hydrogen, wind turbines or wind power installations, photovoltaic installations, biomass installations, biogas installations, waste incineration installations, industrial installations, conventional power plants and/or the like.

The measured signal typically extends over a time range. In other words, the measured signal is a time series of the measured values of the measured variable with discrete or continuous values within the time range mentioned. The measured signal is in particular a power curve, for example a generation curve and/or a consumption curve. The integral of the power curve over the specified time range (or each portion of the time range) forms an amount of energy. In this sense, the terms power and energy are equivalent and interchangeable within the scope of the present disclosure.

The measured variable is associated with the amount of energy or the energy generated or consumed, which means that the measured variable is connected to the amount of energy. In particular, the amount of energy is an amount of electrical energy, that is to say an amount of electricity. By way of example, the voltage, the current, the active power and/or the reactive power of one or more phases and phase angles are advantageous as measured variables in this case. Provision is made for capturing measured signals from a plurality of measured variables.

The test unit is designed for disaggregation and for issuing the certificate. Furthermore, the test unit is designed to receive the at least one measured signal and to send or transmit the certificate to the energy system. The test unit forms a central test unit for a plurality of energy systems. In other words, the amounts of energy generated or consumed by all of these energy systems are disaggregated and certified by the test unit.

In some embodiments, an accumulated measured signal is captured at a measurement point. By way of example, the voltage and the active power of a phase at the grid connection point of the energy grid are captured within a time range. The time series thus generated for each of the measured variables then forms a respective measured signal. In this sense, the measured signal is accumulated, since it captures the measured variable, for example the voltage and/or the active power of a phase, from at least a plurality of, in particular all, energy installations that feed in or output electrical energy (electricity) in the stated time range of the measurement. This corresponds to known energy systems, which typically only capture the output or feeding-in at the grid connection point. It is therefore not readily apparent from the accumulated measured signal which of the energy installations of the energy system is contributing or has contributed to the accumulated measured signal.

The measured signal is disaggregated in order to draw conclusions about the individual in-feeds and/or outputs of the energy installations of the energy system. In some embodiments, this is not effected by the energy system, but by the central test unit that is external to the energy system. To this end, the captured measured signal is transmitted to the test unit by the energy system. In other words, the energy system and the test unit are connected to one another for exchanging data. The data can be exchanged via the Internet, for example by means of a computer-to-computer connection (peer-to-peer) and/or by means of a blockchain, preferably in encrypted form.

The test unit disaggregates the transmitted and received measured signal by means of a disaggregation method. Known disaggregation methods can be used here. The method of disaggregation can also be referred to as fingerprinting. The individual power curves and therefore the individual amounts of energy of the energy installations of the energy system can be determined and associated with the individual energy installations by way of the disaggregation method. Known classification methods, for example non-intrusive load monitoring, can also be used for the association. In this case, the respective power curve characterizes the power generated (P(t)<0) or consumed (P(t)>0) by one of the energy installations within the time range. The respective installation-specific amount of energy is therefore obtained from the integral (continuous or discrete) of the associated power curve. The installation-specific amounts of energy ascertained in this way are associated with the respective energy installation of the energy system by the test unit. As a result, a classification is carried out by the test unit.

If the installation-specific amount of energy of the at least one energy installation of the energy system has been ascertained by the test unit by means of the disaggregation, the amount of energy ascertained or, in the case of a plurality of energy installations, the amounts of energy ascertained are certified. In other words, the test unit issues a certificate for the amount of energy ascertained. In this way, the test unit attests to which amount of energy was generated or consumed by which energy installation. Certification is therefore a method that is used to demonstrate compliance with certain requirements. The test unit can be provided and/or operated by the TÜV [technical inspection agency] or comparable independent organizations. By way of example, the generation and therefore typically the feeding-in by a photovoltaic installation within a certain time range is thereby ascertained and certified. The test unit thus checks which amount of energy comes from which energy installation. The test unit therefore forms a certification authority that is central to the energy systems or energy subsystems, in particular when the method is used for a plurality of energy systems or a plurality of energy subsystems of an energy system.

The ascertained certificate or certificates are then transmitted to the energy system by the test unit. In other words, the energy system receives the certificate or certificates. As a result, the energy system can, for example, offer a certified, that is to say attested or tested, amount of energy generated from renewable sources, in particular within a local energy market. This leads to a more precise determination of the amount of energy generated from renewable sources without any further effort, for example through the installation of additional measurement points. This can promote the expansion of renewable energies.

Various embodiments of the present disclosure thus avoid complex and, in particular, cost-intensive operation of a plurality of measurement points. In particular, there are no new investment costs for energy systems that already exist. Furthermore, they may allow certification at a detailed temporal granularity. It is thereby possible to implement prices that are variable over time, which for the first time enable expedient integration into a local energy market. Furthermore, this allows for invoicing at clear-cut intervals and operation of the energy system that is as optimum as possible.

In some embodiments, an energy system, in particular with a plurality of generation installations, may obtain increased revenue from the amount of energy generated, in particular the amount of electricity generated, for the respective installation. This is therefore the case, since the certification of renewable installations or energy installations makes it possible to offer the certified amount of energy under better conditions, especially within a local energy market. Overall, this promotes renewable energies and their expansion.

In some embodiments, the energy system comprises at least one (one or more) energy installations, in particular one or more energy generation installations, wherein an installation-specific amount of energy can be generated or consumed by the at least one energy installation over a time range T. The energy system comprises a measuring device with a communication interface, wherein:
- the measuring device is designed to capture a temporal measured signal, accumulated in relation to the energy system, of at least one measured variable associated with the amount of energy; and
- the captured measured signal can be transmitted to a test unit external to the energy system by means of the communication interface of the measuring device; and
- a certificate issued by the test unit regarding the installation-specific amount of energy can be received by the energy system, wherein the installation-specific amount of energy has been ascertained by the test unit by means of a disaggregation.

In some embodiments, the energy system is connected via a grid connection point to an energy grid for energy exchange, and the accumulated measured signal is captured at this grid connection point of the energy system. This ensures that essentially all energy installations of the energy system that feed a certain amount of energy into or output a certain amount of energy from the energy grid within a time range are captured by the measured signal. Furthermore, existing energy systems typically have a measuring device at their grid connection point, as a result of which advantageously no additional measuring devices or measurement points have to be installed. Further measuring devices or measurement points for capturing the measured signal can be alternatively or additionally provided.

In some embodiments, a voltage, a current, a phase angle, an active power and/or a reactive power are/is used as the measured variable. In other words, the energy grid to which the energy system is connected via the grid connection point is a power grid. The disaggregation may be improved by the measured variables mentioned. Further energy grids, chemical networks (gas and/or hydrogen) and/or networks relating to thermal energy/heat, for example local heating networks and/or district heating networks, can alternatively or additionally be provided. In this case, measured variables may include an inlet temperature, a return temperature, and/or a flow rate.

In some embodiments, the captured measured signal is transmitted and/or the certificate is received by a calibrated measuring device with a communication interface, in particular by a smart meter. Smart meters already have a communication interface (smart meter gateway) that can be used for communication, that is to say for exchanging data with the test unit. Furthermore, smart electricity meters capture the measured signal, for example the voltage, the current, the active power and/or reactive power, digitally. As a result, additional investment cost can be avoided.

In some embodiments, the structure of the energy system with regard to its energy installations is additionally transmitted to the test unit, and the transmitted structure is taken into account in the disaggregation. This may further improve the disaggregation.

The structure of the energy system is, for example, the type and number of its energy installations. By way of example, the energy system transmits the fact that it comprises a cogeneration plant, a photovoltaic installation and one or more energy consumers. Furthermore, the energy system can particularly preferably transmit a topology of its internal energy grid, in particular power grid. Further data and/or metadata with regard to the energy system and/or its energy installations can be provided for transmission to the test unit and for disaggregation. In other words, the data mentioned can be taken into account in the disaggregation.

In some embodiments, geographical coordinates of the energy system, weather data and/or historical measured signals are additionally transmitted as data to the test unit, and there is a plausibility check of the ascertained installation-specific amount of energy based on the additionally transmitted data. The plausibility check can be used to check whether the installation-specific amount of energy ascertained by way of the disaggregation appears coherent in view of the present and transmitted data. This avoids misuse, for example by emulating certain generation powers by means of a battery and an inverter. For example, regionally comparable energy systems are compared with one another. This allows a comparison to be made between different energy systems, for example with regard to the amount of energy/power generated by means of photovoltaics. This is therefore the case, since the regionally specific solar radiation (and/or hours of sunshine) can be used to draw conclusions about the conclusiveness of the respective measured signal.

In some embodiments, the measured signals to be certified can be compared with historical measured values from comparable installations in the same regional environment. This may improve the accuracy of the plausibility check. Furthermore, data from installations that are integrated into other local energy markets, but are also certified by the test unit as the central certification authority, can be taken into account in the plausibility check or used for the plausibility check.

In some embodiments, the measured signal extends over a time range of at most 20 minutes, in particular of at most 15 minutes. This may ensure a sufficiently high temporal resolution. This may be advantageous in particular for integrating the energy system into a local energy market. In other words, the amount or amounts of energy generated or consumed by the energy system may be certified in time ranges of no more than 20 minutes or no more than 15 minutes long.

In some embodiments, at least one power curve of the energy installation is ascertained by way of the disaggregation, and the power curve is received by the energy system. The accumulated measured signal is typically a power curve P(t). N energy installations with their respective power curves $P_n(t)$ contribute to this accumulated measured signal. The individual installation-specific power curves $P_n(t)$ are not known. Only the accumulated measured signal $P(t)=\Sigma_{n=1}^{N}P_n(t)$, that is to say the sum of all powers (given a mathematical sign), is captured and transmitted to the test unit. By means of the disaggregation, the individual power curves are or should be ascertained from the summed signal mentioned, i.e. from the accumulated measured signal, and associated with the respective installations. The installation-specific amount of energy in the time range T results from the integral of the ascertained installation-specific power curve, i.e. it is $E_n=\int_T P_n(t)dt$.

In other words, the measured power, for example at the grid connection point $P_{PCC}(t)$, is composed of N energy installations to be classified, which each feed a power $P_n(t)$ into the power grid ($P_n(t)<0$) or output said power from the power grid ($P_n(t)>0$) for a time $t\in T$. In addition, the captured measured signal comprises noise $\delta(t)$, which is typically the same for all energy installations, that is to say independent of the index n. Therefore, $P_{PCC}(t)=\Sigma_{n=1}^{N}P_n(t)+\delta(t)$. One result of the disaggregation is the association of the individual components of the measured signal with a set of available energy installations (A) (assets), for example a photovoltaic installation, cogeneration plant and/or others. In other words, the association $P_n(t)\rightarrow A$ or $E_n\rightarrow A$ takes place by way of the disaggregation for all $t\in T$, wherein T denotes the time range over which the measured signal $P_{PCC}(t)$ extends. The disaggregation can take place by means of a neural network. In this case, in addition to the further data mentioned above, for example a voltage and/or a phase angle, $P_{PCC}(t)$ is used as input and therefore as training for the neural network, which is trained for said classification (output). In a method of this kind, the quantity and quality of the input data or training data are particularly relevant.

In some embodiments, the energy system is integrated into a local energy market, and the certificate received by the energy system is transmitted to the local energy market. In other words, the energy system may be integrated into a local energy market for exchanging energy and/or data.

In some embodiments, the certification, in particular with a correspondingly small time resolution (15-minute period, i.e. T=15 Minutes), allows the energy system to participate in a local energy market.

In some embodiments, historical measured signals and/or metadata of the energy system are transmitted to the test unit by the local energy market. The use of these transmitted historical measured signals and/or metadata in the disaggregation can improve the disaggregation. In other words, the individual power curves of the energy installations or their energy generated or consumed within a time range can be ascertained from the transmitted accumulated measured signals in an improved manner by way of the disaggregation. The historical measured data can extend over a time range longer than 20 minutes or 15 minutes.

FIG. 1 shows a diagram of a method incorporating teachings of the present disclosure. An energy system 2 comprises a plurality of energy installations 21, 22, 23, namely a cogeneration plant 21, a photovoltaic installation 22, and one or more energy consumers 23. The energy system 2 has a power grid that is internal to the energy system 2 and is connected via a grid connection point 3 to a power grid 1 that is external to the energy system 2, for example a public power grid 1. As a result, the energy system 2 can feed electrical energy, i.e. electricity, into the power grid 1 or output same from the power grid 1. Typically, the energy system 2 supplies or draws a specific power at a time. The integral of the power fed in or drawn over a time range results in an amount of energy fed in or output by the energy system 2 in this time range. Each of the installations 21, 22, 23 has an installation-specific power and an installation-specific amount of energy.

Typically, the installation-specific powers or installation-specific amounts of energy are not ascertained, since the measurement points or measuring devices required for this are not provided or not installed. In the present case, the energy system 2 only has one measuring device 24 for capturing a measured signal 240 (P(t), abscissa: time t, ordinate: power P) with regard to the power/amount of energy fed in or consumed at the grid connection point 3. In other words, the energy system 2 only comprises one measurement point for its current feed-in and/or current output from the power grid 1. The measured signal 240, captured by the measuring device 24, of a measured variable, for example the voltage, the current, the active power and/or the reactive power, is therefore a summed signal, i.e. an accumulated measured signal 240.

In some embodiments, the accumulated measured signal 240 is captured for a specified time range. The capture of the accumulated measured signal is identified by the reference sign 20. In the present case, the accumulated measured signal 240 is an active power curve. The power assumes positive values when the energy system 2 is drawing from the power grid 1 and negative values when the energy system 2 is feeding into the power grid 1.

The captured accumulated measured signal 240 is transmitted to a test unit 4 external to the energy system 2. This transmission is effected by way of the energy system 2, for example by way of a communication interface, in particular by way of a smart meter and/or an energy management system of the energy system 2. In addition, further data, for example the structure of the energy system 2 and/or its installation types and/or metadata regarding the energy system 2 and/or in relation to its energy installations 21, 22, 23, can be transmitted or transferred to the test unit 4. The transmission of the captured measured signal 240 and possibly the further data/metadata to the test unit 4 is indicated by the arrow 100. The data transmission or data transmissions preferably take place with encryption.

The accumulated measured signal 240 is disaggregated 40 by means of the test unit 4, that is to say that the individual installation-specific contributions to the accumulated measured signal 240 are ascertained. The contributions can be the respective installation-specific power and/or the respective installation-specific amounts of energy. Known methods can be used for the disaggregation 40. In the present exemplary embodiment, the results of the disaggregation 40 are the individual installation-specific power curves 41. Three power curves 41 (generation curves or consumption curves) are therefore ascertained for the three installations 21, 22, 23, the sum of which results in the accumulated measured signal 240. The installation-specific amount of energy within the specified time range can be ascertained from the ascertained installation-specific power curves 41. To this end, the power curves 41 and therefore the installation-specific amounts of energy are associated with the respective installations 21, 22, 23.

The installation-specific amounts of energy ascertained by the test unit 4 are certified by the test unit 4, that is to say that the test unit confirms the correctness of the ascertained installation-specific amount of energy independently of the energy system 2. This certifies the generation or consumption of the respective installation in the specified time range. Issuing the certification or the certification is identified with the reference sign 42.

The method described is typically carried out for a plurality of energy systems or energy subsystems. In other words, a plurality of energy systems transmit their measured signal to the same test unit 4, which disaggregates the measured signals and certifies the respective installation-specific amounts of energy. With respect to these energy systems, the test unit 4 is a central, in particular independent, testing body or certification authority. By way of example, the test unit 4 is provided and/or operated by the TÜV [technical inspection agency].

The ascertained installation-specific power curves 41 and/or the ascertained installation-specific amounts of energy and/or the certification 42 are/is transmitted to the energy system 2 and received by the energy system 2. Typically, the transmission of the certification of the installation-specific amounts of energy is sufficient. The transmission of the certification 42 is indicated by the arrow 101. In other words, a certificate regarding the respectively generated amount of energy of the installations 21, 22, 23 to be classified is therefore transmitted to the energy system 2.

Figure 2:
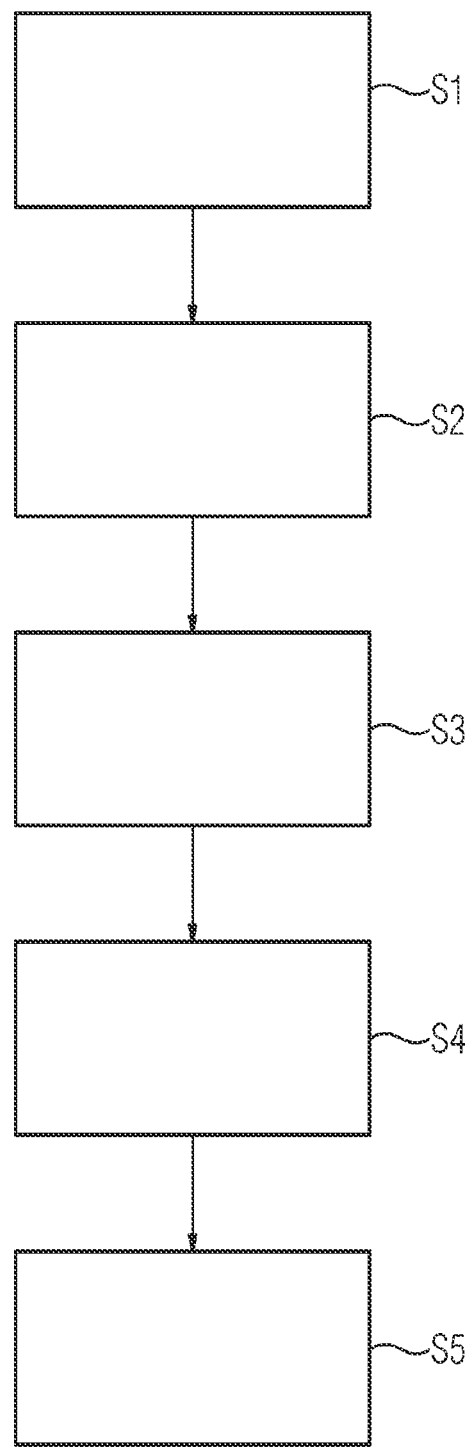
FIG. 2 shows a flow chart of the method incorporating teachings of the present disclosure.

FIG. 2 shows a flow diagram of an example method incorporating teachings of the present disclosure. In a first step S1 of the method, at least one temporal measured signal, accumulated in relation to the energy system, of at least one measured variable associated with the (generated or consumed) amount of energy is captured. Typically, the amount of energy is an amount of electrical energy. The voltage, the current, the active power and/or the reactive power of one or more phases and phase angles are advantageous as associated measured variables.

In a second step S2 of the method, the recorded accumulated measured signal is transmitted to a test unit that is external to the energy system. The transmission can be carried out by a measuring device with a communication interface, in particular by a smart meter. The data transmission is preferably encrypted. A measured signal is particularly preferably captured at least every 15 minutes (or more frequently) and transmitted to the test unit.

In a third step S3 of the method, the transmitted measured signal is disaggregated by the test unit, wherein the installation-specific amount of energy is ascertained by way of the disaggregation. The installation-specific amount of energy can be ascertained by ascertaining the installation-specific power curves. In other words, the installation-specific power curves are alternatively or additionally ascertained by way of the disaggregation. The time integral, for example the discrete sum, of the installation-specific power curves results in the respective installation-specific amount of energy.

In a fourth step S4 of the method, a certificate regarding the ascertained installation-specific amount of energy is issued by the test unit. In this way, the test unit confirms that the energy installation, which is associated with the ascertained installation-specific amount of energy, of the energy system has generated or consumed the ascertained installation-specific amount of energy within the specified time range.

In a fifth step S5 of the method, the certificate issued by the test unit is received by the energy system. In other words, the test unit transmits the certificate or, in the case of a plurality of installation-specific amounts of energy, the certificates to the energy system. The certificate can therefore be used by the energy system, for example within a local energy market. The test unit can also be part of a local energy market. In other words, a local energy market comprises the test unit that is central to its participants.

The methods can be carried out periodically, for example repeatedly for a time range of 15 minutes. In other words, every 15 minutes, the energy system transmits a measured signal that extends over the last 15 minutes (T=15 Minutes) to the test unit, which disaggregates the measured signal and transmits back to the energy system the installation-specific amounts of energy thus ascertained (generation or consumption in the last 15 minutes mentioned) and the respective certificate regarding the amount of energy generated or consumed in the last 15 minutes mentioned. This enables a quasi-continuous method that is advantageous in particular for integrating the energy system into a local energy market.

The methods can be at least partially and/or fully computer-aided. In particular, one and/or more steps of the method and/or its configurations are computer-aided. Although the teachings herein have been described and illustrated in more detail by way of the exemplary embodiments, the scope of the disclosure is not restricted by the disclosed examples or other variations may be derived therefrom by a person skilled in the art without departing from the scope of protection.

LIST OF REFERENCE NUMERALS

1 Power grid
2 Energy system
3 Grid connection point
4 Test unit
20 Capturing the accumulated measured signal
21 Cogeneration plant
22 Photovoltaic installation
23 Energy consumer
24 Measuring device
40 Disaggregation
41 Power curves
42 Issuing a certificate
100 Transmitting the accumulated measured signal
101 Receiving the certificate
240 Captured accumulated measured signal
S1 First step
S2 Second step
S3 Third step
S4 Fourth step
S5 Fifth step

What is claimed is:

1. A method for certifying at least one installation-specific amount of energy, wherein the installation-specific amount of energy has been generated or consumed by an energy installation of an energy system, the method comprising:
   capturing a temporal measured signal accumulated in relation to the energy system of a measured variable associated with the amount of energy;
   transmitting the captured signal to a test unit external to the energy system;
   disaggregating the transmitted signal using the test unit and ascertaining the installation-specific amount of energy by way of the disaggregation;
   issuing a certificate regarding the ascertained installation-specific amount of energy; and
   receiving the issued certificate at the energy system.

2. The method as claimed in claim 1, wherein:
   the energy system is connected via a grid connection point to an energy grid for energy exchange; and
   the accumulated measured signal is captured at the grid connection point of the energy system.

3. The method as claimed in claim 1, wherein the measured variable comprises at least one measurement selected from the group consisting of: a voltage, a current, a phase angle, an active power, and a reactive power.

4. The method as claimed in claim 1, wherein the captured signal is transmitted and/or the certificate is received by a calibrated measuring device with a communication interface.

5. The method as claimed in claim 1, further comprising transmitting the structure of the energy system with regard to energy installations to the test unit; and
   wherein the test unit accounts for the transmitted structure at in the disaggregation.

6. The method as claimed in claim 1, further comprising transmitting geographical coordinates of the energy system, weather data, and/or historical measured signals to the test unit;
   wherein the test unit performs a plausibility check of the ascertained installation-specific amount of energy based on the additionally transmitted data.

7. The method as claimed in claim 1, wherein the measured signal extends over a time range of at most 20 minutes.

8. The method as claimed in claim 1, further comprising:
   ascertaining a power curve of the energy installation by way of the disaggregation; and
   transmitting the power curve to the energy system.

9. The method as claimed in claim 1, wherein:
   the energy system is integrated into a local energy market; and
   the certificate received by the energy system is transmitted to the local energy market.

10. The method as claimed in claim 9, wherein historical measured signals and/or metadata of the energy system are transmitted to the test unit by the local energy market.

11. An energy system comprising:
    an energy installation, wherein an installation-specific amount of energy can be generated or consumed over a time range; and
    a measuring device with a communication interface, wherein
    the measuring device captures a temporal measured signal, accumulated in relation to the energy system of a measured variable associated with the amount of energy; and
    the measuring device transmits the captured measured signal to a test unit external to the energy system using the communication interface; and
    the energy system receives a certificate issued by the test unit regarding the installation-specific amount of energy can be received by the energy system;
    wherein the installation-specific amount of energy has been ascertained by the test unit by means of a disaggregation.

12. The energy systems as claimed in claim 11, wherein the energy system is integrated into a local energy market for exchanging energy.

13. A test unit for certifying an installation-specific amount of energy, wherein the installation-specific amount of energy has been generated or consumed by an energy installation of an energy system, the test unit comprising:
    a receiver for capturing a temporal measured signal accumulated in relation to the energy system of a measured variable associated with the amount of energy;
    a processor for disaggregating the transmitted signal using the test unit, and ascertaining the installation-specific amount of energy by way of the disaggregation; and
    a transmitter for issuing a certificate regarding the ascertained installation-specific amount of energy.

* * * * *